United States Patent
Lv et al.

(10) Patent No.: US 12,057,889 B1
(45) Date of Patent: Aug. 6, 2024

(54) UNDERWATER WIRELESS OPTICAL COMMUNICATION SYSTEM

(71) Applicant: SHENZHEN TECHNOLOGY UNIVERSITY, Shenzhen (CN)

(72) Inventors: Zhijian Lv, Shenzhen (CN); Lulu Zha, Shenzhen (CN); Jinpeng Tian, Shenzhen (CN); Wenwei Zhang, Shenzhen (CN)

(73) Assignee: SHENZHEN TECHNOLOGY UNIVERSITY, Shenzhen (CN)

( * ) Notice: Subject to any disclaimer, the term of this patent is extended or adjusted under 35 U.S.C. 154(b) by 0 days.

(21) Appl. No.: 18/272,793

(22) PCT Filed: Oct. 25, 2022

(86) PCT No.: PCT/CN2022/127177
§ 371 (c)(1),
(2) Date: Jul. 17, 2023

(87) PCT Pub. No.: WO2024/050932
PCT Pub. Date: Mar. 14, 2024

(30) Foreign Application Priority Data

Sep. 8, 2022 (CN) .......................... 202211092581.7

(51) Int. Cl.
*H04B 10/60* (2013.01)
*H04B 10/54* (2013.01)
*H04B 13/02* (2006.01)

(52) U.S. Cl.
CPC ............ *H04B 10/54* (2013.01); *H04B 10/60* (2013.01); *H04B 13/02* (2013.01)

(58) Field of Classification Search
None
See application file for complete search history.

(56) References Cited

U.S. PATENT DOCUMENTS

| | | | |
|---|---|---|---|
| 8,229,304 B1 * | 7/2012 | Pepper | H04B 10/61 398/209 |
| 2005/0196170 A1 * | 9/2005 | Winsor | H04B 10/1121 398/118 |

(Continued)

FOREIGN PATENT DOCUMENTS

| | | |
|---|---|---|
| CN | 103684612 A | 3/2014 |
| CN | 104092494 A | 10/2014 |

(Continued)

*Primary Examiner* — Tanya T Motsinger

(57) ABSTRACT

Provided is an underwater wireless optical communication system. The system includes an emitting end and a receiving end; where the emitting end includes a beam emitting module and an optical phased array, where the beam emitting module is configured to emit a communication beam obtained by modulating communication information, and the optical phased array is configured to adjust an emission direction of the communication beam; and the receiving end includes a tracking module and an information demodulation module, where the tracking module is configured to receive a target communication beam emitted after adjustment by the optical phased array and align the target communication beam, and the information demodulation module is configured to demodulate the received target communication beam to obtain the communication information.

8 Claims, 1 Drawing Sheet

(56) References Cited

U.S. PATENT DOCUMENTS

| | | | | |
|---|---|---|---|---|
| 2013/0089289 | A1* | 4/2013 | Sorin | G02B 6/32 |
| | | | | 385/33 |
| 2014/0149764 | A1* | 5/2014 | Gunther | H02M 3/156 |
| | | | | 713/320 |
| 2014/0248058 | A1* | 9/2014 | Simpson | H04B 13/02 |
| | | | | 398/104 |
| 2015/0177868 | A1* | 6/2015 | Morein | G06F 3/03545 |
| | | | | 345/174 |
| 2018/0108802 | A1* | 4/2018 | Chen | H01L 31/167 |
| 2018/0114809 | A1* | 4/2018 | Kawahito | H01L 27/14623 |
| 2018/0188943 | A1* | 7/2018 | Morita | G06F 3/0487 |
| 2022/0345221 | A1* | 10/2022 | Mitchell | H04B 10/1121 |
| 2023/0291473 | A1* | 9/2023 | Furuyama | H04B 10/2507 |
| 2024/0088999 | A1* | 3/2024 | Lv | H04B 10/516 |

FOREIGN PATENT DOCUMENTS

| | | |
|---|---|---|
| CN | 112491470 A | 3/2021 |
| CN | 112910561 A | 6/2021 |
| CN | 114221702 A | 3/2022 |
| CN | 114244445 A | 3/2022 |
| CN | 115173947 A | 10/2022 |

* cited by examiner

UNDERWATER WIRELESS OPTICAL COMMUNICATION SYSTEM

CROSS-REFERENCE TO RELATED APPLICATIONS

This is a national stage application filed under 37 U.S.C. 371 based on International Patent Application No. PCT/CN2022/127177, filed Oct. 25, 2022, which claims priority to Chinese Patent Application No. 202211092581.7 filed with the China National Intellectual Property Administration (CNIPA) on Sep. 8, 2022, the disclosures of which are incorporated herein by reference in its their entireties.

TECHNICAL FIELD

Embodiments of the present application relate to the technical field of underwater communication, for example, an underwater wireless optical communication system.

BACKGROUND

The exploitation and acquisition of marine resources are almost inseparable from underwater communication. Underwater wireless communication (UWC) plays a key role in underwater navigation and is also one of key techniques of an underwater sensor network. Therefore, increasingly high requirements are imposed on the transmission rate and the transmission distance of the UWC technology. Underwater wireless optical communication (UWOC) has a broad application prospect among underwater communication due to the characteristics of a high bandwidth, a strong anti-interference capability, and the like and can achieve not only high-rate transmission but also long-distance propagation. However, since the transmission of light in water is affected by interference factors such as absorption, scattering, turbulence, and bubbles, a UWOC system is misaligned, affecting a communication quality.

SUMMARY

Embodiments of the present application provide an underwater wireless optical communication system to achieve beam steering at an emitting end and self-alignment at a receiving end, thereby avoiding an effect of misalignment and increasing an information transmission rate.

Embodiments of the present application provide an underwater wireless optical communication system. The system includes an emitting end and a receiving end; where the emitting end includes a beam emitting module and an optical phased array, where the beam emitting module is configured to emit a communication beam obtained by modulating communication information, and the optical phased array is configured to adjust an emission direction of the communication beam; and the receiving end includes a tracking module and an information demodulation module, where the tracking module is configured to receive a target communication beam emitted after an adjustment of the optical phased array and align the target communication beam, and the information demodulation module is configured to demodulate the received target communication beam to obtain the communication information.

In an exemplary embodiment, the optical phased array has an insulating layer thickness of 2 μm and a silicon thickness of 220 nm.

In an exemplary embodiment, the optical phased array includes an edge coupler having an inverted taper structure.

In an exemplary embodiment, the optical phased array includes a fully etched and shallowly etched grating antenna with a duty cycle of 0.5, a grating period of 0.659 μm, an antenna width of 0.55 μm, and an etch width of 0.5 μm.

In an exemplary embodiment, a light source for the beam emitting module is a laser diode.

In an exemplary embodiment, a modulation manner of the beam emitting module is Non-Return-to-Zero On-OFF Keying.

In an exemplary embodiment, the tracking module includes a light direction sensor configured to generate light sensing signals of multiple regions according to amounts of the target communication beam received in different regions and an electric motor configured to adjust a direction of a photosensitive plane of the light direction sensor according to the light sensing signals to align the target communication beam.

In an exemplary embodiment, the light direction sensor includes a metal wall, and a first photodiode and a second photodiode that are the same in dimension and symmetrically arranged on two sides of the metal wall, where the first photodiode and the second photodiode are configured to generate the light sensing signals.

In an exemplary embodiment, the beam emitting module includes an integrated tester, a bias tee, and a direct current power supply, where the integrated tester is configured to generate a pseudo-random binary sequence as the communication information through a mode generator of the integrated tester, and the direct current power supply is configured to drive the bias tee of the laser diode to modulate the communication information to obtain the communication beam.

In an exemplary embodiment, the receiving end further includes a power amplifier, a low-pass filter, and a digital analyzer, and the target communication beam received by the tracking module is amplified by the power amplifier and filtered by the low-pass filter in sequence and then analyzed by the digital analyzer for a communication quality.

DETAILED DESCRIPTION

Figure 1:
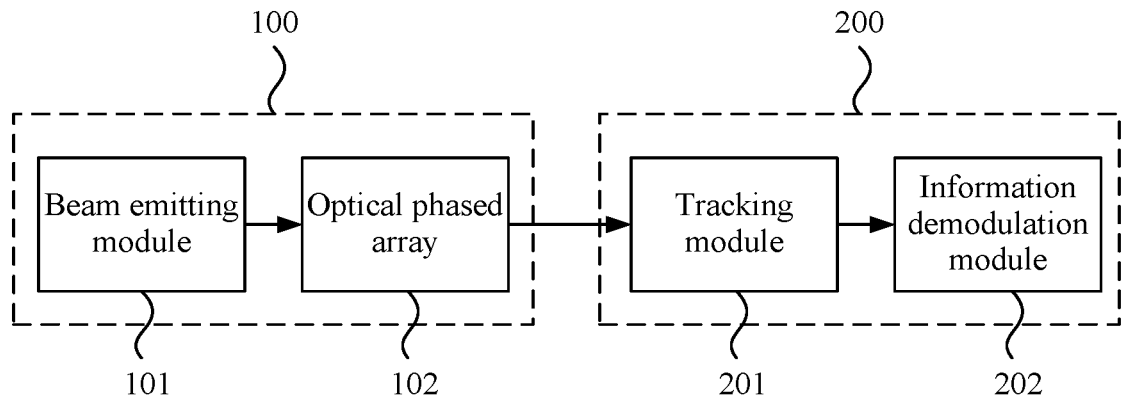
FIG. 1 is a structure diagram of an underwater wireless optical communication system according to embodiment one of the present application.

The present application is described below in conjunction with drawings and embodiments. It is to be understood that embodiments described herein are intended to illustrate the present application and not to limit the present application. Additionally, it is to be noted that for ease of description, only part of structures related to the present application are illustrated in the drawings.

Before example embodiments are discussed, it is to be noted that some example embodiments are described as processing or methods depicted in flowcharts. Although multiple steps are described as sequential processing in the flowcharts, many of the steps may be implemented concurrently, coincidentally, or simultaneously. Additionally, the sequence of the multiple steps may be rearranged. The processing may be terminated when operations are completed, but the processing may further have additional steps that are not included in the drawings. The processing may correspond to a method, a function, a procedure, a subroutine, a subprogram, or the like.

Additionally, terms such as "first" and "second" may be used herein to describe multiple directions, actions, steps, elements, or the like, but these directions, actions, steps, or elements are not limited by the terms. The terms are only used for distinguishing a first direction, action, step, or element from another direction, action, step, or element. For example, without departing from the scope of embodiments of the present application, a first photodiode may be referred to as a second photodiode, and similarly, the second photodiode may be referred to as the first photodiode. Both the first photodiode and the second photodiode are photodiodes, but they are not the same photodiode. The terms such as "first" and "second" cannot be construed as indicating or implying relative importance or implicitly indicating the number of technical features as indicated. Thus, a feature defined as a "first" feature or a "second" feature may explicitly or implicitly include one or more of such features. As described in embodiments of the present application, the term "multiple" is defined as at least two, for example, two, three, or the like, unless otherwise expressly limited.

Embodiment One

FIG. 1 is a structure diagram of an underwater wireless optical communication system according to embodiment one of the present application. This embodiment is applicable to the case where wireless optical communication is performed underwater. As shown in FIG. 1, the system includes an emitting end 100 and a receiving end 200; where the emitting end 100 includes a beam emitting module 101 and an optical phased array 102, where the beam emitting module 101 is configured to emit a communication beam obtained by modulating communication information, and the optical phased array 102 is configured to adjust an emission direction of the communication beam; and the receiving end 200 includes a tracking module 201 and an information demodulation module 202, where the tracking module 201 is configured to receive a target communication beam emitted after an adjustment of the optical phased array 102 and align the target communication beam, and the information demodulation module 202 is configured to demodulate the received target communication beam to obtain the communication information.

The optical phased array (OPA) 102 provides a powerful on-chip method for two-dimensional beam steering. The optical phased array 102 may use a laser working in a light waveband as an information carrier and thus is free from interference of a traditional radio wave. Moreover, the optical phased array 102 has good confidentiality since the laser has a narrow beam and is not easy to detect. Additionally, compared with an electrical phased array with a large area, the optical phased array may be integrated on one chip and has the advantages of a small size, a light weight, good flexibility, and low power consumption. The application of the optical phased array to underwater wireless optical communication can achieve fast and accurate on-chip beam steering so that the optical phased array has strong robustness in the UWOC system.

The emitting end 100 may modulate the communication information through the beam emitting module 101, that is, the communication information is processed and added to an optical carrier to be in a form suitable for optical transmission so that the communication beam is obtained, and then the communication beam is emitted. The beam emitting module 101 may emit the communication beam through a wideband laser and may select a laser diode as a light source. In an example, a modulation manner of the beam emitting module 101 is Non-Return-to-Zero On-OFF Keying (NRZ-OOK) to reduce a bit error rate. The emitted communication beam, such as stable transverse electric (TE) light from the wideband laser, may be coupled to an OPA chip through an end-fire coupling system of the optical phased array 102 and a lens fiber of the optical phased array 102, and then an excited TE0 mode may be transmitted through a wideband multi-mode interference (MMI) coupler tree to a grating antenna array (which may include 64 grating antenna elements and have an array period of about 2.0 μm). The optical phased array 102 may introduce a phase difference into the grating antenna elements to complete beam deflection, for example, a wavelength of the laser is heated and scanned by an integrated heater so that two-dimensional beam steering in an array direction and an antenna direction can be achieved. Following a grating equation, an outcoupling angle $\theta_0$ in the antenna direction may be expressed as sin $\theta_0$=neff−λ/Λ, where neff denotes an effective index of the TE0 mode, λ denotes a wavelength of underwater spatial light, and Λ denotes a grating period. In an example, the optical phased array 102 is manufactured by using a standard complementary metal-oxide semiconductor (CMOS) process, with an insulating layer thickness of 2 μm and a silicon thickness of 220 nm. In an example, the optical phased array 102 includes an edge coupler having an inverted taper structure, thereby improving the efficiency with which an optical fiber is coupled to the OPA chip. In an example, the optical phased array 102 includes a fully etched and shallowly etched grating antenna with a duty cycle of 0.5, a grating period of 0.659 μm, an antenna width of 0.55 μm, and an etch width of 0.5 μm. As an important performance indicator of underwater communication, a detection range of underwater optical communication is determined by a field of view (FOV) related to a steering angle of the optical phased array 102. Through integration, the optical phased array 102 provides a compact, reliable, and non-mechanical solution to the steering of the communication beam and still maintains a relatively small divergence and a relatively wide steering angle range of the communication beam. The emitting end 100 may dynamically adjust the emission direction of the communication beam through the optical phased array 102 and receive a reflected signal of the communication beam so that the emitting end 100 knows the position of the receiving end 200, facilitating alignment.

The receiving end 200 may receive, through the tracking module 201, the target communication beam emitted from the emitting end and adjust an angle at which the tracking module 201 receives the target communication beam. When detecting that a photosensitive plane of the tracking module 201 does not directly face the target communication beam or deflects greatly from the direction in which the photosensitive plane directly faces the target communication beam, the receiving end 200 may adjust the photosensitive plane along a direction opposite to the deflection direction, so as to achieve alignment. The receiving end 200 may also demodulate, through the information demodulation module 202, the target communication beam received by the tracking module 201 to obtain the required communication information. After the tracking module 201 completes the alignment, the communication information obtained by the information demodulation module 202 through demodulation is more accurate.

Based on the preceding technical solutions, in an exemplary embodiment, the tracking module 201 includes a light direction sensor configured to generate light sensing signals of multiple regions according to amounts of the target communication beam received in different regions; and an electric motor configured to adjust a direction of a photosensitive plane of the light direction sensor according to the light sensing signals to align the target communication beam. The light direction sensor may be used, for example, a two-dimensional light direction sensor may be used for light sensing as a light receiver. Moreover, light may be sensed in different regions of the light direction sensor separately, the angle between the photosensitive plane of the light direction sensor and the target communication beam may be determined according to the received amounts of the target communication beam corresponding to the multiple regions, and the corresponding light sensing signals may be generated through the multiple regions of the light direction sensor, so as to perform processing by use of the light sensing signals. After the light sensing signals are obtained, the light sensing signals may be used in combination with a tracking circuit, and a current deflection direction of the light direction sensor is determined so that a motor driving signal is generated. The tracking module 201 may implement a mechanical rotation process for the alignment through the electric motor, where the electric motor may be a servo motor controlled through pulse-width modulation (PWM). Different motor driving signals may control the electric motor to deflect in different directions, and a mechanical transmission device is added between the electric motor and the light direction sensor so that the direction of the photosensitive plane of the light direction sensor can be adjusted through the electric motor, thereby tracking the target communication beam and pointing to a particular direction. The light direction sensor and the tracking circuit may be integrated on a CMOS monolithic photodetector.

Figure 2:
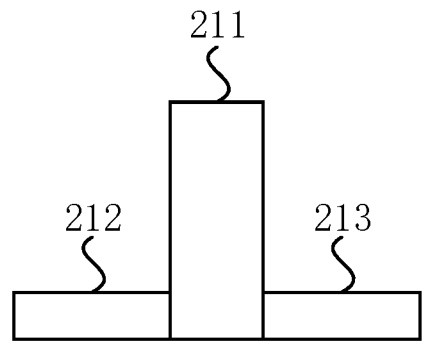
FIG. 2 is a structure diagram of a light direction sensor according to embodiment one of the present application.

In an exemplary embodiment, as shown in FIG. 2, the light direction sensor includes a metal wall 211, and a first photodiode 212 and a second photodiode 213 that are the same in dimension and symmetrically arranged on two sides of the metal wall 211, where the first photodiode 212 and the second photodiode 213 are configured to generate the light sensing signals. The metal wall 211 may be created through a metal layer, a contact point, and a via in a stacking process, and the metal wall 211 is opaque to light. When the light direction sensor deflects to a certain degree, an angle θ (not equal to 0) is formed between the target communication beam and the metal wall 211 and a micro-scale shadow is formed on a photodiode on one side, that is, an amount of the target communication beam received by the photodiode on one side is reduced and thus the generated light sensing signal (such as a photocurrent) becomes smaller so that the deflection of the light direction sensor can be determined according to different photocurrent values. The first photodiode 212 and the second photodiode 213 are the same in dimension, that is, a photosensitive surface of the first photodiode 212 and a photosensitive surface of the second photodiode 213 are the same in length and width. Meanwhile, the metal wall 211 may be perpendicular to the photosensitive surface of the first photodiode 212 and perpendicular to the photosensitive surface of the second photodiode 213 so that it is more convenient to determine the deflection of the light direction sensor according to the light sensing signals. When the target communication beam is incident in parallel with the metal wall 211 (θ=0), amounts of the target communication beam received by the first photodiode 212 and the second photodiode 213 are the same so that the two photodiodes generate the same photocurrent value. When the angle between the target communication beam and the metal wall 211 is θ (not equal to 0), the amount of the target communication beam received by the photodiode on one side is reduced so that the photodiode on one side generates a smaller photocurrent value than the photodiode on the other side. Two photocurrent values are directly compared so that the deflection of the light direction sensor can be determined conveniently. For a relationship between the photocurrent values generated by the photodiodes on two sides and the angle θ, reference may be made to the following relationship:

$$\frac{I_L}{I_R} = \begin{cases} \frac{(1+\beta)L\cdot\cos\theta + \alpha H\cdot\sin\theta}{(1+\beta)L\cdot\cos\theta - H\cdot\sin\theta}, & \theta \geq 0 \\ \frac{(1+\beta)L\cdot\cos\theta + H\cdot\sin\theta}{(1+\beta)L\cdot\cos\theta - \alpha H\cdot\sin\theta}, & \theta \leq 0 \end{cases}$$

$I_L$ denotes a photocurrent generated by the first photodiode 212, $I_R$ denotes a photocurrent generated by the second photodiode 213, $\alpha$ denotes the ratio of reflected light to total light reaching the first photodiode 212 on a side of the metal wall 211, $\beta$ denotes the ratio of reflected light to total light reaching reaching the second photodiode 213 on the other side of the metal wall 211, H denotes the height of the metal wall 211, L denotes the length of each of the two photodiodes in the direction perpendicular to the metal wall 211, where $\alpha$ and $\beta$ depend on a process, a layout, and encapsulation and are constants. It may be determined from the relationship that a current ratio between $I_L$ and $I_R$ is independent of a light intensity and depends on only the angle θ. Considering a balance between the field of view and accuracy, the height of the metal wall 211 may be set to 12 μm, thereby optimizing the performance of the light direction sensor. Meanwhile, the physical dimension 12 μm is much greater than a wavelength of absorbed light so that diffraction has a relatively small effect on the performance of the light direction sensor. Based on the above structure, the light direction sensor may cover a range of 120° and reach an alignment accuracy of 1.9°.

Figure 3:
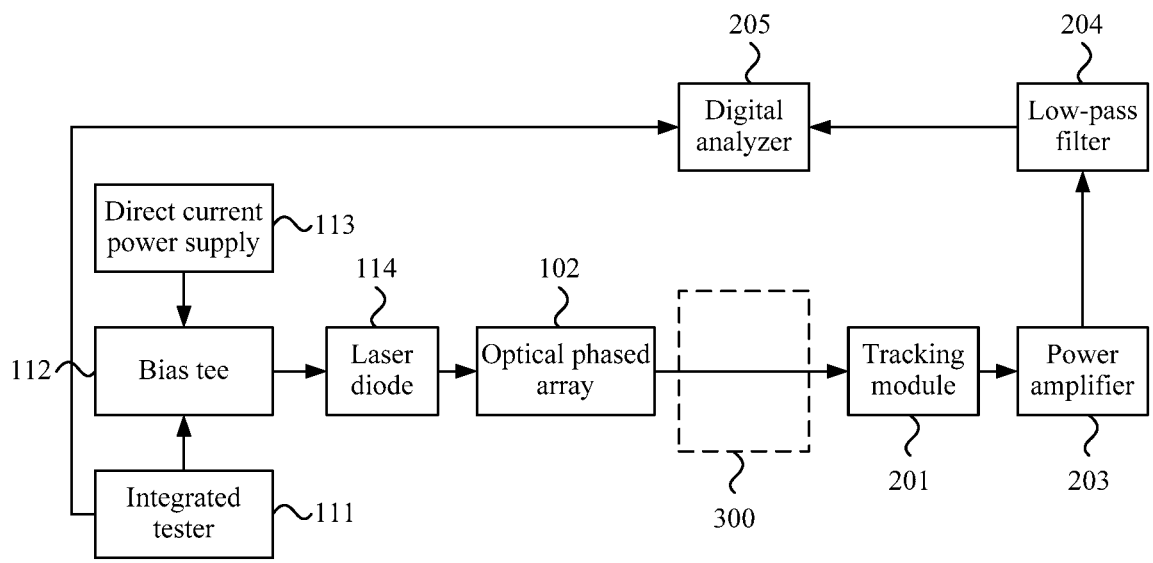
FIG. 3 is a structure diagram of another underwater wireless optical communication system according to embodiment one of the present application.

Based on the preceding technical solutions, in an exemplary embodiment, as shown in FIG. 3, the beam emitting module includes an integrated tester 111, a bias tee 112, and a direct current power supply 113, where the integrated tester 111 is configured to generate a pseudo-random binary sequence as the communication information through a mode generator of the integrated tester 111, and the direct current power supply 113 is configured to drive a direct current (DC) bias of the laser diode 114 to modulate the communication information to obtain the communication beam. In an example, as shown in FIG. 3, the receiving end further includes a power amplifier 203, a low-pass filter 204, and a digital analyzer 205, and the target communication beam received by the tracking module 201 is amplified by the power amplifier 203 and filtered by the low-pass filter 204 in sequence and then analyzed by the digital analyzer 205 for a communication quality. The UWOC system using the laser diode 114, the optical phased array 102, and an NRZ-OOK modulation scheme may be simulated for a test in a water tank 300 to determine the feasibility of the UWOC system. At the emitting end, the laser diode (with a collimating lens) 114 may be mounted on a thermal electric cooler (TEC) module (where SaNoor SN-LDM-T-P may be selected), the mode generator in the integrated tester (J-BERT, where Agilent E4832A may be selected) 111 may generate a pseudo-random binary sequence (PRBS) 215-1 mode as the communication information, and the direct current (DC) power supply (where SaNoor laser driver-5A may be selected) 113 may drive the DC bias of the laser diode (where a blue laser disc (LD) may be selected) 114 to modulate the communication information to obtain the communication beam. After emitted from the laser diode 114, the laser is adjusted by the optical phased array 102 and transmitted via the water tank 300 to the receiving end. At the receiving end, the CMOS monolithic photodetector may collect light and generate the photocurrents (through the tracking module 201), and an output signal of the CMOS monolithic photodetector is amplified by the power amplifier (where small circuit ZHL-6A-S+ may be selected) 203, filtered by the low-pass filter (for example, 800 MHZ) 204, and analyzed by the digital analyzer 205. An analysis process may include: analyzing an eye diagram by a wideband oscilloscope, measuring a small signal system bandwidth by a parameter network analyzer (such as ROHDE and SCHW-ARZ vector network analyzer ZVB8), and the like. A bit error rate (BER) and a data rate may also be measured by the integrated tester 111, and the digital analyzer 205 may be provided with a clock by the integrated tester 111.

The underwater wireless optical communication system provided by embodiments of the present application includes the emitting end and the receiving end, where the emitting end includes the beam emitting module and the optical phased array, the beam emitting module emits the communication beam obtained by modulating the communication information, and the optical phased array adjusts the emission direction of the communication beam; and the receiving end includes the tracking module and the information demodulation module, the tracking module may align the target communication beam after receiving the target communication beam emitted after the adjustment of the optical phased array, and the information demodulation module demodulates the received target communication beam to obtain the required communication information. The underwater wireless optical communication system provided by embodiments of the present application achieves beam steering at the emitting end and self-alignment at the receiving end so that the system has good sensitivity to an incident angle, expands the field of view at the receiving end, and increases received optical power and a signal-to-noise ratio, ensuing a low bit error rate and achieving a high transmission rate. Thus, the entire UWOC link is robust and reliable.

What is claimed is:

1. An underwater wireless optical communication system, comprising:
   an emitting end and a receiving end; wherein
   the emitting end comprises a beam emitting module and an optical phased array, wherein the beam emitting module is configured to emit a communication beam obtained by modulating communication information, and the optical phased array is configured to adjust an emission direction of the communication beam; and
   the receiving end comprises a tracking module and an information demodulation module, wherein the tracking module is configured to receive a target communication beam emitted after adjustment by the optical phased array and align the target communication beam, and the information demodulation module is configured to demodulate the received target communication beam to obtain the communication information;
   wherein the tracking module comprises:
   a light direction sensor configured to generate light sensing signals of a plurality of regions according to amounts of the target communication beam received in different regions; and
   an electric motor configured to adjust a direction of a photosensitive plane of the light direction sensor according to the sensing signals to align the target communication beam;
   wherein the light direction sensor comprises a metal wall and a first photodiode and a second photodiode that are the same in dimension and symmetrically arranged on two sides of the metal wall, wherein the first photodiode and the second photodiode are configured to generate the light sensing signals.

2. The underwater wireless optical communication system according to claim 1, wherein the optical phased array has an insulating layer thickness of 2 μm and a silicon thickness of 220 nm.

3. The underwater wireless optical communication system according to claim 1, wherein the optical phased array comprises an edge coupler having an inverted taper structure.

4. The underwater wireless optical communication system according to claim 1, wherein the optical phased array comprises a fully etched and shallowly etched grating antenna with a duty cycle of 0.5, a grating period of 0.659 μm, an antenna width of 0.55 μm, and an etch width of 0.5 μm.

5. The underwater wireless optical communication system according to claim 1, wherein a light source for the beam emitting module is a laser diode.

6. The underwater wireless optical communication system according to claim 1, wherein a modulation manner of the beam emitting module is Non-Return-to-Zero On-OFF Keying.

7. The underwater wireless optical communication system according to claim 5, wherein the beam emitting module comprises an integrated tester, a bias tee, and a direct current power supply, wherein the integrated tester is configured to generate a pseudo-random binary sequence as the communication information through a mode generator of the integrated tester, and the direct current power supply is configured to drive a direct current bias of the laser diode to modulate the communication information to obtain the communication beam.

8. The underwater wireless optical communication system according to claim 1, wherein the receiving end further comprises a power amplifier, a low-pass filter, and a digital analyzer, and the target communication beam received by the tracking module is amplified by the power amplifier and filtered by the low-pass filter in sequence and then analyzed by the digital analyzer for a communication quality.

* * * * *